United States Patent
Jang et al.

(10) Patent No.: US 6,331,209 B1
(45) Date of Patent: Dec. 18, 2001

(54) METHOD OF FORMING CARBON NANOTUBES

(75) Inventors: Jin Jang, 102-1103 Hyundai Apt., 53 Jamwon-dong, Seocho-gu, Seoul; Suk-jae Chung, Seoul, both of (KR)

(73) Assignees: Jin Jang; Iljin Nanotech Co., Ltd., both of (KR)

( * ) Notice: Subject to any disclaimer, the term of this patent is extended or adjusted under 35 U.S.C. 154(b) by 0 days.

(21) Appl. No.: 09/556,816

(22) Filed: Apr. 21, 2000

(30) Foreign Application Priority Data

Apr. 21, 1999 (KR) .................................................. 99-14306
Apr. 14, 2000 (KR) .................................................. 00-19559

(51) Int. Cl.$^7$ .................................................. C30B 25/18
(52) U.S. Cl. ............................... 117/90; 117/94; 117/95; 117/103; 117/929; 423/445
(58) Field of Search .................... 117/90, 94, 95, 117/103, 929; 423/445

(56) References Cited

U.S. PATENT DOCUMENTS

| | | | |
|---|---|---|---|
| 5,698,175 | 12/1997 | Hiura et al. | |
| 5,916,642 | * 6/1999 | Chang | 427/580 |
| 6,062,931 | * 5/2000 | Chuang et al. | 445/24 |
| 6,097,138 | * 8/2000 | Nakamoto | 313/309 |
| 6,156,256 | * 6/1999 | Kennel | 264/461 |
| 6,159,538 | * 12/2000 | Rodriguez et al. | 427/213.31 |

FOREIGN PATENT DOCUMENTS

| | | |
|---|---|---|
| 5-133048 | 5/1993 | (JP) . |
| 8-12310 | 1/1996 | (JP) . |

OTHER PUBLICATIONS

C. Journet et al., "Large–scale production of single–walled carbon nanotubes by the electric–arc technique," Nature, vol. 388, Aug. 21, 1977, pp. 756–758.

D.S. Bethune et al., "Cobalt–catalysed growth of carbon nanotubes with single–atomic–layer walls," Nature, vol. 363, Jun. 17, 1993, pp. 605–607.

A. Thess et al., "Crystalline Ropes of Metallic Carbon Nanotubes," Science, vol. 273, Jul. 26, 1996, pp. 483–487.

R. Andrews et al., "Continuous production of aligned carbon nanotubes: a step closer to commercial realization," Chemical Physics Letters, Apr. 16, 1999, pp. 467–474.

W.Z. Li et al., "Large–scale Synthesis of Aligned Carbon Nanotubes," Science, vol. 274, Dec. 6, 1996, pp. 1701–1703.

Kingsuk Mukhopadhyay et al., "A Simple and Novel Way to Synthesize Aligned Nanotube Bundles at Low Temperature," Japan J. Appl. Phys., vol. 37, Part 2, No. 10B, Oct. 15, 1998, pp. L1257–L1259.

Z.F. Ren et al., "Synthesis of Large Arrays of Well–Aligned Carbn Nanotubes on Glass," Science, vol. 282, Nov. 6, 1998, pp. 1105–1107.

(List continued on next page.)

*Primary Examiner*—Robert Kunemund
(74) *Attorney, Agent, or Firm*—Burns, Doane, Swecker & Mathis, L.L.P.

(57) ABSTRACT

An easy method of forming purified carbon nanotubes from which graphitic phase or carbon particles are removed, using a high-density plasma. Carbon nanotubes are grown on a substrate using a plasma chemical vapor deposition method at a high plasma density of $10^{11}$ cm$^{-3}$ or more. The carbon nanotube formation includes: growing a carbon nanotube layer on a substrate to have a predetermined thickness by plasma deposition; purifying the carbon nanotube layer by plasma etching; and repeating the growth and the purification of the carbon nanotube layer. For the plasma etching, a halogen-containing gas, for example, a carbon tetrafluoride gas, is used as a source gas.

13 Claims, 7 Drawing Sheets

OTHER PUBLICATIONS

M. Kusunoki et al., "Epitaxial carbon nanotube film self–organized by sublimation decomposition of silicon carbide," Appl. Phys. Lett., vol. 71, No. 18, Nov. 3, 1977, pp. 2620–2622.

S. Iijima, "Helical microtubules of graphitic carbon," Nature, vol. 354, Nov. 7, 1991, pp. 56–58.

S. Kanemaru et al., "Active Matrix of Si Field Emitters Driven by Built–in MOSFETS," IDW '97, pp. 735–738, 1997.

H. Gamo et al., "Actively–Controllable Field Emitter Arrays with Built–in Thin Film Transistors on Glass For Active –Matrix FED Applications," IDW '98, pp. 667–670, 1998.

* cited by examiner

METHOD OF FORMING CARBON NANOTUBES

This disclosure is based on Korean Patent Applications Nos. 99-14306 and 00-19559 filed on Apr. 21, 1999 and Apr. 14, 2000, respectively, herein incorporated by reference.

BACKGROUND OF THE INVENTION

1. Field of the Invention

The present invention relates to a method of forming carbon nanotubes, and more particularly, to the growth and purification of carbon nanotubes using plasma.

2. Description of the Related Art

Carbon, the most important constituent element, which is combined with oxygen, hydrogen, nitrogen and the like, of all organisms including the human body, has four unique crystalline structures including diamond, graphite, fullerene and carbon nanotubes. In particular, carbon nanotubes refer to a helical tubular structure grown with a single wall or multi-wall, which can be obtained by rolling up a sheet formed of a plurality of hexagons, the sheet formed by combining each carbon atom thereof with three neighboring carbon atoms. The carbon nanotubes have a diameter in the order of a few nanometers to a few hundred nanometers. Carbon nanotubes can function as either a conductor, like metals, or a semiconductor, according to the rolled shape and the diameter of the helical tubes. Also, its hollow structure with a predetermined length allows for good mechanical, electrical and chemical properties, so that carbon nanotubes are known to be a material for field emission devices, hydrogen containers and electrodes of rechargeable batteries.

Originally, carbon nanotubes produced by an arc discharge between two graphite rods was discovered and reported in an article entitled "Helical Microtubules of Graphitic Carbon" (Nature, Vol. 354, Nov. 7, 1991, pp. 56–58) by Sumio Iijima. This technique is commonly used to produce carbon nanotubes, however, yield of pure carbon nanotubes with respect to the end product is only about 15%. Thus, a complicated purification process must be carried out for particular device applications.

Another conventional approach to produce carbon nanotubes, which was described in an article entitled "Epitaxial Carbon Nanotube Film Self-organized by Sublimation Decomposition of Silicon Carbide" (Appl. Phys. Lett. Vol. 71, pp. 2620, 1977), by Michiko Kusunoki, is to produce carbon nanotubes at high temperatures by irradiating a laser onto graphite or silicon carbide. In this case, the carbon nanotubes are produced from graphite at about 1200° C. or more and from silicon carbide at about 1600 to 1700° C. However, this method also requires multiple stages of purification which increases the cost. In addition, this method has difficulties in large-device applications.

A method of producing carbon nanotubes through a thermal decomposition of hydrocarbon series gases by chemical vapor deposition (CVD) was reported by W. Z. Li et al. in an article entitled "Large-Scale Synthesis of Aligned Carbon Nanotubes" (Science, Vol. 274, Dec. 6, 1996, pp. 1701–1703). This technique is applicable only with a gas that is unstable, such as acetylene or benzene. For example, a methane ($CH_4$) gas cannot be used to produce carbon nanotubes by this technique.

SUMMARY OF THE INVENTION

It is an objective of the present invention is to provide a method of forming carbon nanotubes, in which carbon nanotubes are grown with a high density using a high-density plasma.

It is another objective of the present invention to provide a method of forming carbon nanotubes, in which carbon nanotubes are purified by removing graphite or carbon particles using a high-density plasma, so that carbon nanotubes can be easily grown with a high density.

To achieve the first objective of the present invention, there is provided a method of forming carbon nanotubes, in which a carbon nanotubes layer is grown on a substrate using a plasma chemical vapor deposition method at a high density of $10^{11}$ $cm^{-3}$ or more. Preferably, the substrate is an amorphous silicon or polysilicon substrate on which a catalytic metal layer is formed. In the growth of the carbon nanotube layer, a hydrocarbon series gas may be used as a plasma source gas, the temperature of the substrate may be in the range of 600 to 900° C., and the pressure may be in the range of 10 to 1000 mTorr.

To achieve the second objective of the present invention, there is provided a method of forming carbon nanotubes, comprising growing a carbon nanotube layer on a substrate to have a predetermined thickness by plasma deposition. Next, the carbon nanotube layer is purified by plasma etching. Then the growth and the purification of the carbon nanotube layer are repeated.

Preferably, growing the carbon nanotube layer is carried out by a plasma chemical vapor deposition method at a high plasma density of $10^{11}$ $cm^{-3}$ or more. In purifying the carbon nanotube layer, a halogen-containing gas or an oxygen containing gas may be used as a plasma source gas for etching.

According to the present invention, high-density carbon nanotubes can be grown by decomposing a stable $CH_4$ gas with high-density plasma. Also, high-purity carbon nanotubes can be formed easily by repeating the growth and purification of carbon nanotubes.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

The present invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the concept of the invention to those skilled in the art.

Figure 1:
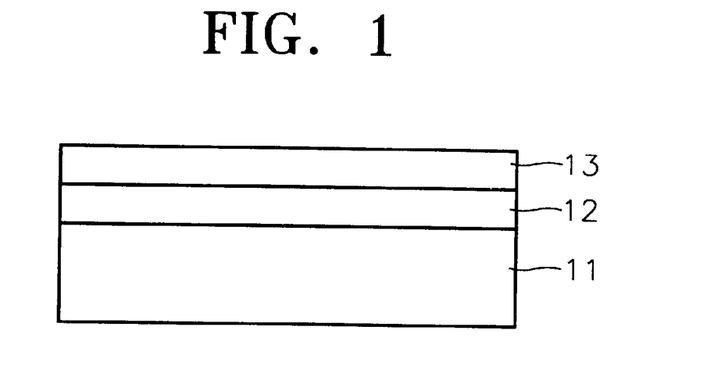
FIG. 1 is a sectional view showing a substrate for use in the formation of carbon nanotubes according to a preferred embodiment of the present invention

Referring to FIG. 1, a substrate for use in the formation of carbon nanotubes according to a preferred embodiment of the present invention is shown. A silicon thin film 12 and a catalytic metal layer 13 are formed in sequence on a predetermined substrate 11. The substrate 11 is a rigid insulating substrate that can endure a subsequent plasma process. In the present embodiment, a glass substrate, which allows for easy deposition of the silicon thin film 12 thereon, is used. The silicon thin film 12 may be formed of amorphous silicon or polysilicon. The catalytic metal layer 13 may be formed of a transition metal, such as nickel, cobalt and iron, or an alloy thereof.

Figure 2:
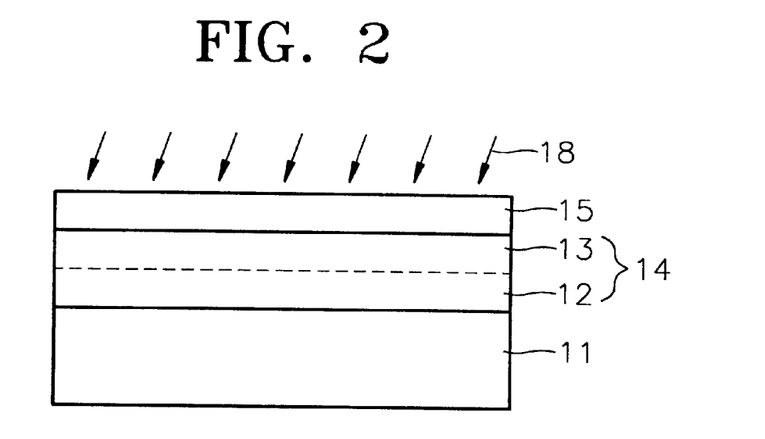
FIGS. 2 through 6 are sectional views illustrating the stages of forming carbon nanotubes according to the preferred embodiment of the present invention

In the present embodiment, amorphous silicon is deposited on the substrate 11 to a thickness of a few hundred to a few thousand angstroms, and nickel is then deposited thereon to a thickness of a few tens to a few hundreds of angstroms. When the silicon thin film 12 is formed of amorphous silicon and a subsequent plasma deposition process illustrated in FIG. 2 is carried out at a temperature of 600° C. or more, the nickel deposited thereon diffuses into the amorphous silicon thin film 12, which results in a metal-induction crystalized polysilicon thin film 14 shown in FIG. 2. The crystallization of the amorphous silicon thin film is facilitated by the diffusion of metal into the amorphous silicon thin film, and occurs during the formation of carbon nanotubes without need for additional steps. Also, a considerable amount of nickel present on the surface of the polysilicon thin film, which is left over from the metal-induction crystallization, acts as a catalytic metal for growing carbon nanotubes in a subsequent process.

Then, a carbon nanotubes layer is grown on the catalytic metal layer 13. FIGS. 2 through 6 are sectional views illustrating the stages of forming carbon nanotubes according to the preferred embodiment of the present invention.

First, referring to FIG. 2, the substrate 11 with the catalytic metal layer 13 is put into a plasma chemical vapor deposition apparatus to grow a carbon nanotube layer 15. In the present embodiment, an inductively coupled plasma apparatus (ICP) capable of generating high-density plasma by application of radio frequency (RF) power, was used. The source gas of deposition plasma 18 for the growth of the carbon nanotube layer 15 may be a hydrocarbon series gas including carbon atoms, such as acetylene or benzene. In the present embodiment, methane ($CH_4$) was used and flowed at 10 sccm. At this time, helium (He) was supplied together at 10 sccm. For the growth of the carbon nanotube layer 15, RF power was maintained at 1 kW, the temperature of the substrate 11 was maintained at 600 to 900° C., and the inner pressure of the apparatus was maintained at 10 to 1000 mtorr. In order to facilitate reactions for the growth of the carbon nanotube layer 15, a nitrogen ($N_2$) gas or hydrogen ($H_2$) gas may be added.

In the present embodiment, the deposition plasma 18 is maintained at a high density of $10^{11}$ $cm^{-3}$ or more, and the carbon nanotube layer 15 is grown to a desired thickness in the range of 3 to 300 nm. The thickness of the carbon nanotube layer 15 increases with an increase in deposition time, and the deposition time can be varied in the range of a few seconds to a few hundred seconds. In a plasma deposition mode, graphitic phase or amorphous carbon particles are also formed at the end or the sidewalls of the carbon nanotubes during the growth of the carbon nanotube layer 15, so that the density of pure carbon nanotubes being grown is very low.

As previously described, where the amorphous silicon thin film 12 and the catalytic metal layer 13 are formed on the substrate 11, the catalytic metal diffuses into the amorphous silicon layer 12 during the growth of the carbon nanotube layer 15, resulting in the metal-induction crystallized polysilicon layer 14 on which a predetermined amount of the catalytic metal remains.

Figure 3:
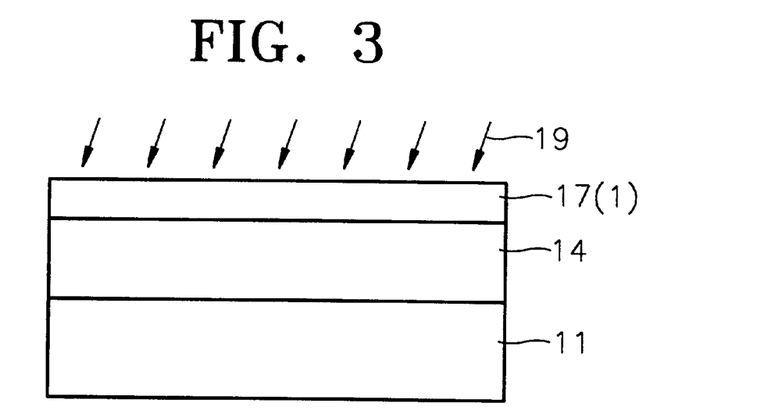

Then, referring to FIG. 3, after changing the conditions of the plasma chemical vapor apparatus from the plasma deposition mode to a plasma etching mode, the graphitic phase or amorphous carbon particles, which are formed during the growth of the carbon nanotube layer 15, are etched away to purify the carbon nanotube layer 15, which results in a purified carbon nanotube layer 17(1). Before the mode conversion into the plasma etching mode, the plasma chemical vapor deposition apparatus is completely purged with a nitrogen gas or inert gas. The processing conditions for plasma etching are set to be essentially the same as in the plasma deposition mode illustrated with reference to FIG. 2, except for the kind of plasma source gas used.

The plasma source gas for use in the plasma etching mode may be a gas containing a halogen element such as F, Cl or Br, or an oxygen-containing gas. In the present embodiment, a fluorine-containing gas, for example, a carbon tetrafluoride ($CF_4$) gas is used. Fluorine ions separated from the carbon tetrafluoride gas produces a highly volatile carbon fluoride series gas ($CF_n$) by reaction with carbon ions. The ionized fluorine is liable to react with carbon ions decomposed from the graphitic phase or amorphous carbon particles that have less binding force than the carbon nanotube layer 15, so that the graphitic phase or amorphous carbon particles can be removed with a high etching selectivity from the carbon nanotubes.

Then, referring to FIG. 4, the plasma etching mode illustrated with reference to FIG. 3 is changed into the plasma deposition mode. Here, the plasma chemical vapor deposition apparatus is purged to completely remove fluorine ions from the apparatus. The plasma deposition mode is carried out under the same conditions illustrated previously with reference to FIG. 3, which results in another carbon nanotube layer 15 on the purified carbon nanotube layer 17(1).

Figure 4:
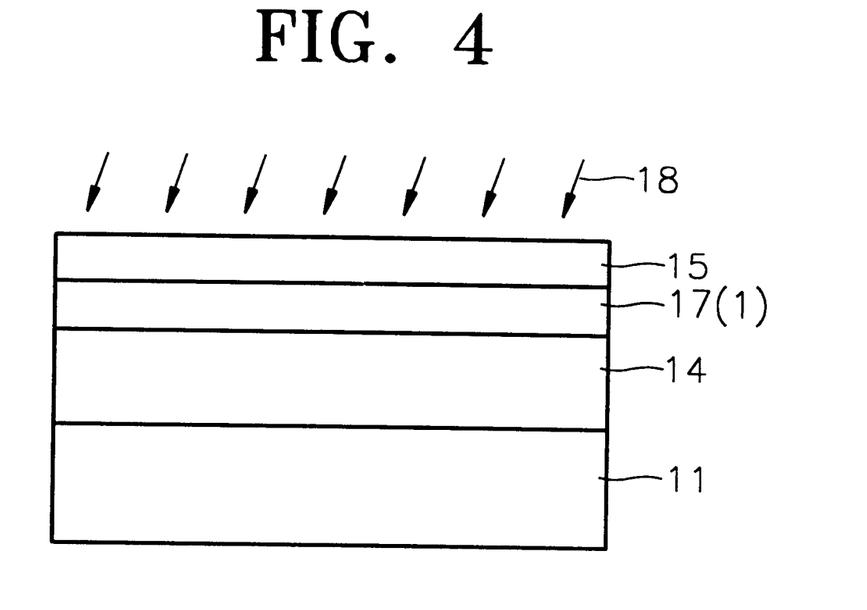
Figure 5:
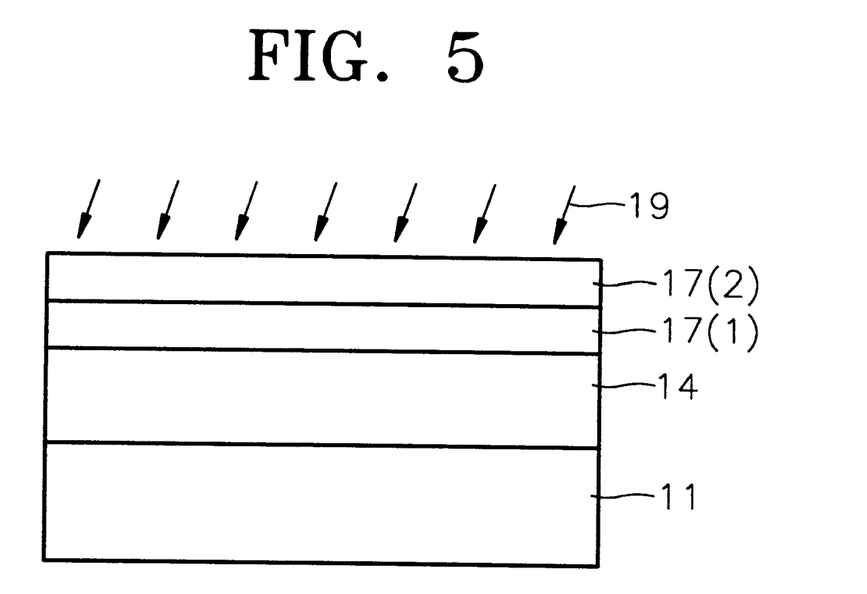

Then, referring to FIG. 5, the plasma deposition mode of FIG. 4 is changed into the plasma etching mode. Here, the plasma chemical vapor deposition apparatus is completely purged. The plasma etching mode is carried out under the same conditions illustrated with reference to FIG. 3, which results in another purified carbon nanotube layer 17(2).

Figure 6:
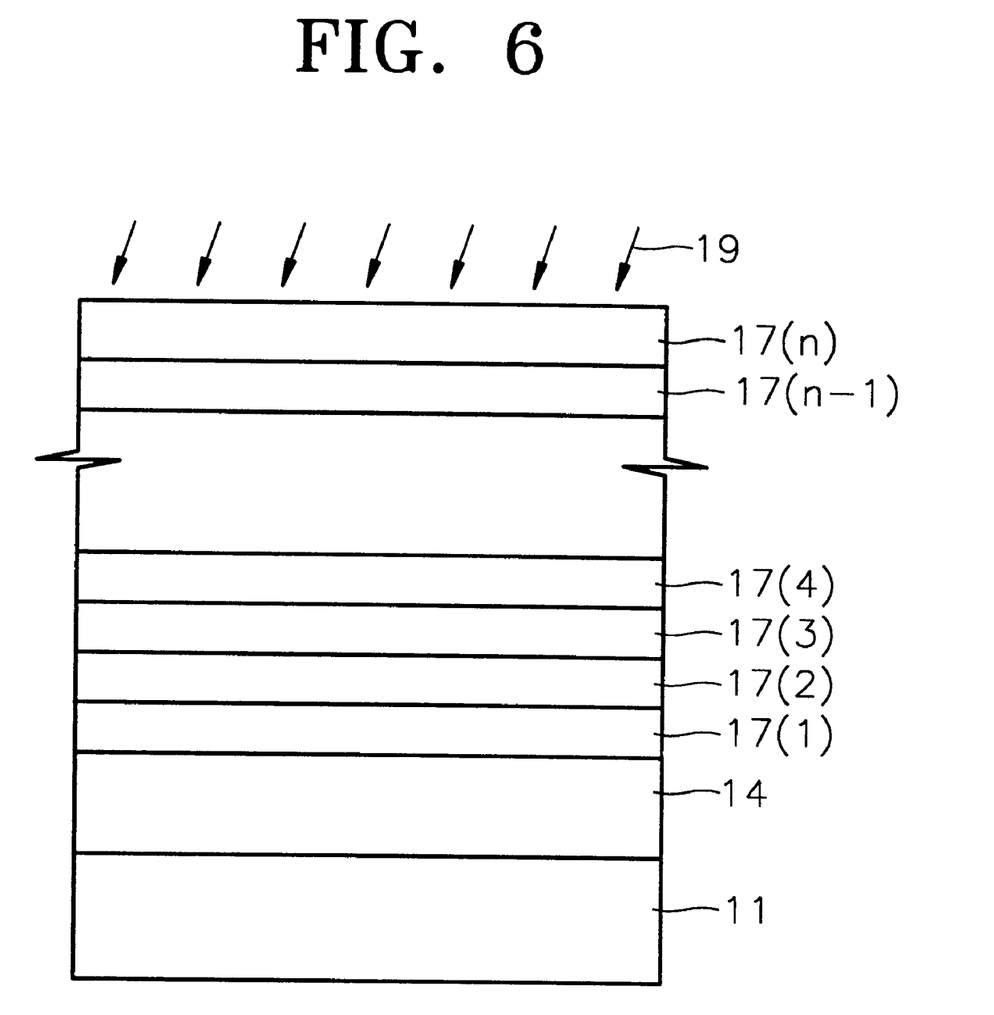

Referring to FIG. 6, the plasma deposition mode and the plasma etching modes, which have been previously described, are repeated n times. The number of repetitions is appropriately determined in consideration of the thickness of the final carbon nanotube layer.

Figure 7:
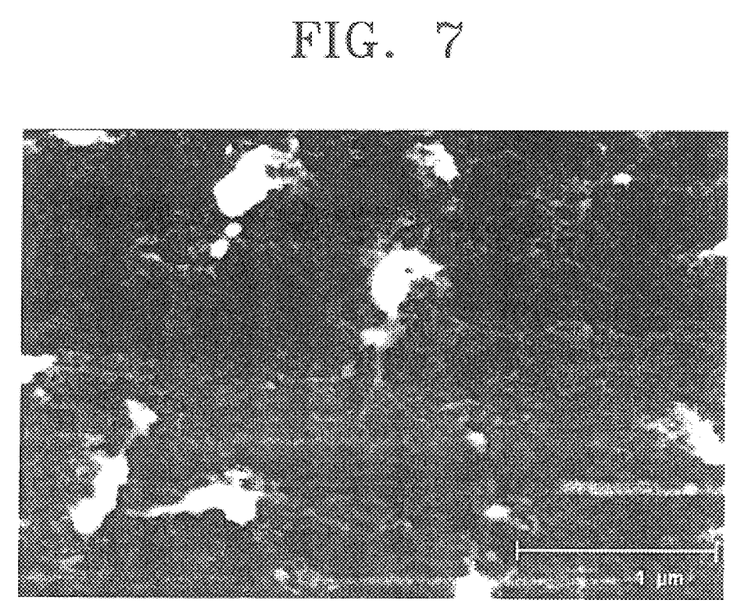
FIG. 7 is a scanning electron microscope (SEM) image of the plane of the carbon nanotubes formed in the preferred embodiment of the present invention.
Figure 8:
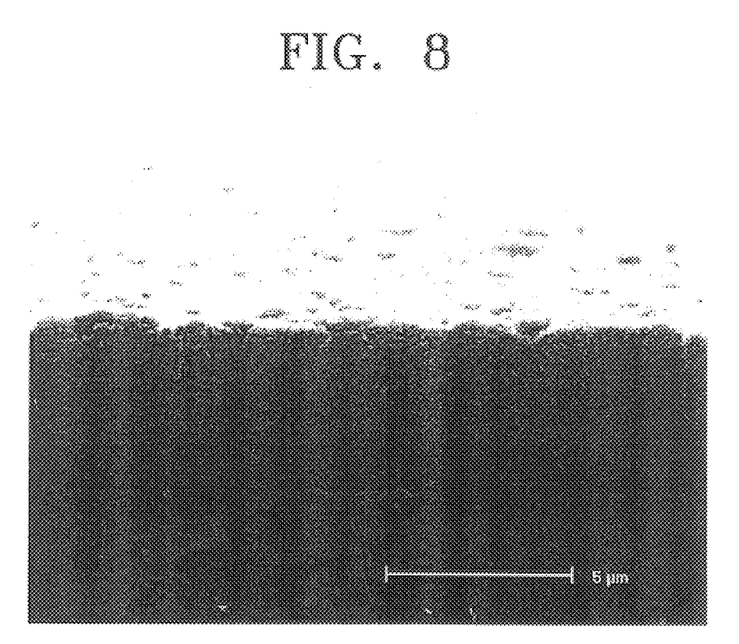
FIG. 8 is a SEM image of a vertical section of the carbon nanotubes formed in the preferred embodiment of the present invention.

FIG. 7 is a scanning electron microscope (SEM) image of the plane of the carbon nanotubes formed in the preferred embodiment of the present invention. FIG. 8 is a SEM image of a vertical section at a different magnification of the carbon nanotubes formed in the preferred embodiment of the present invention. As shown in FIG. 8, carbon nanotubes are well aligned over a substrate.

Figure 9:
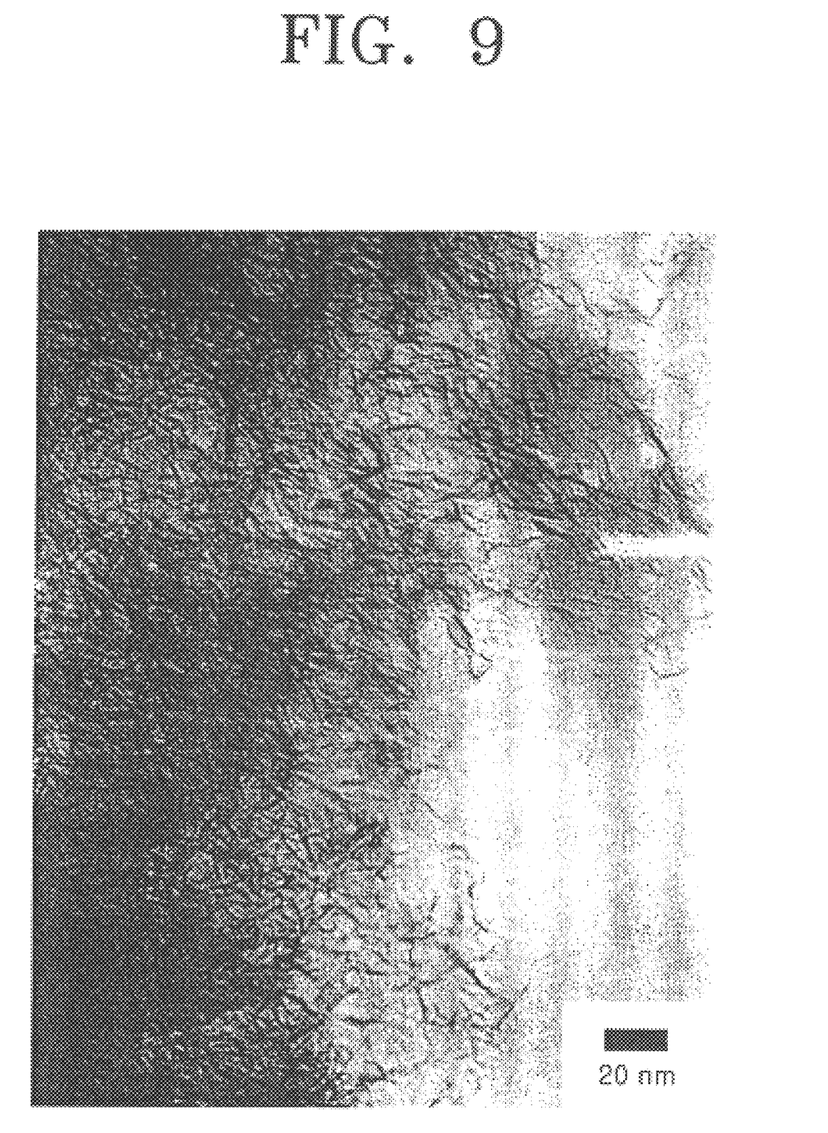
FIG. 9 is a transmission electron microscope (TEM) image of the carbon nanotubes formed in the preferred embodiment of the present invention.
Figure 10:
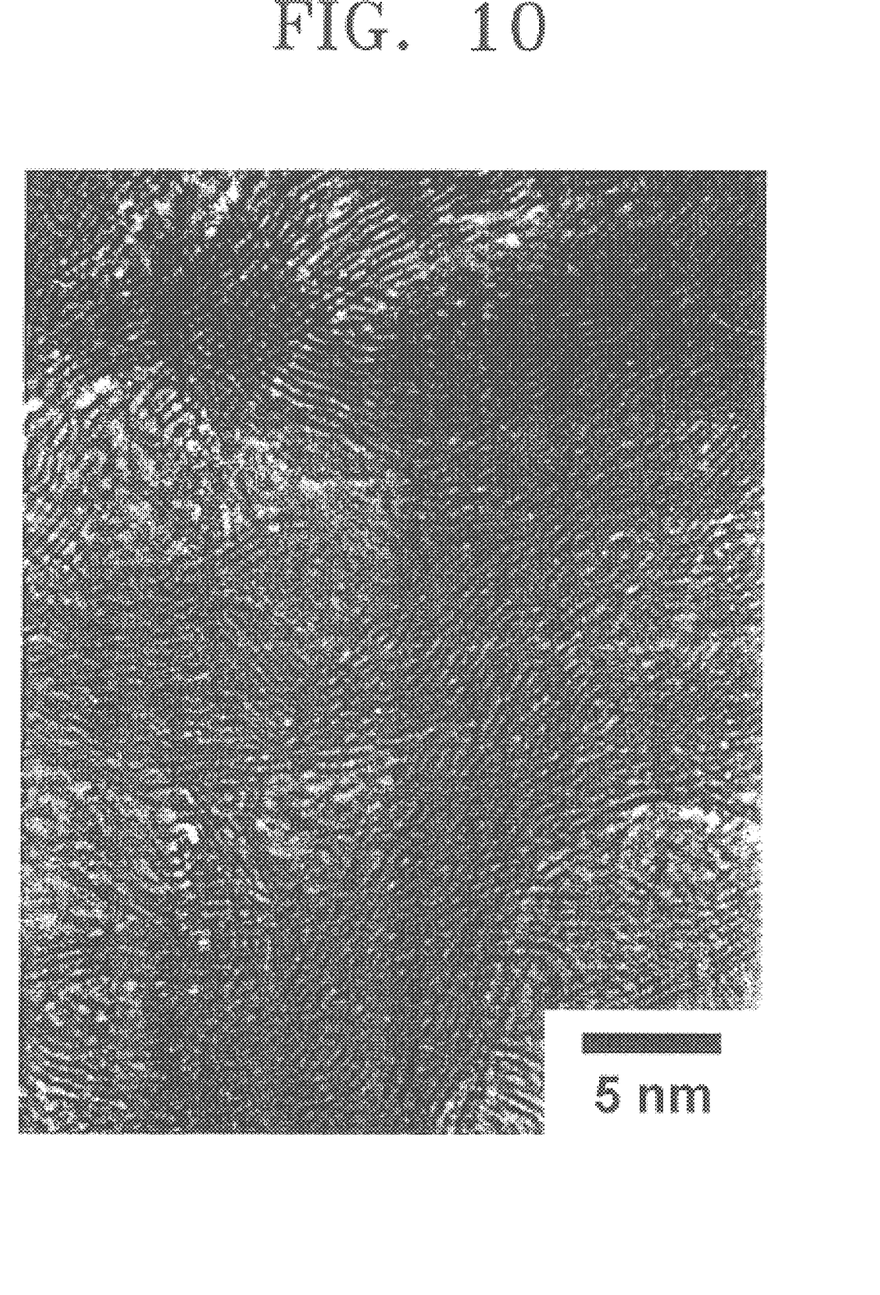
FIG. 10 is a magnified TEM image of the carbon nanotubes formed in the preferred embodiment of the present invention.

FIG. 9 is a transmission electron microscope (TEM) image of the carbon nanotubes formed in the preferred embodiment of the present invention. In FIG. 9, highly tangled filaments are shown. FIG. 10 is a magnified TEM image of the carbon nanotubes formed in the preferred embodiment of the present invention. In FIG. 10 single-walled carbon nanotubes are tangled in bundles with very high density.

Figure 11:
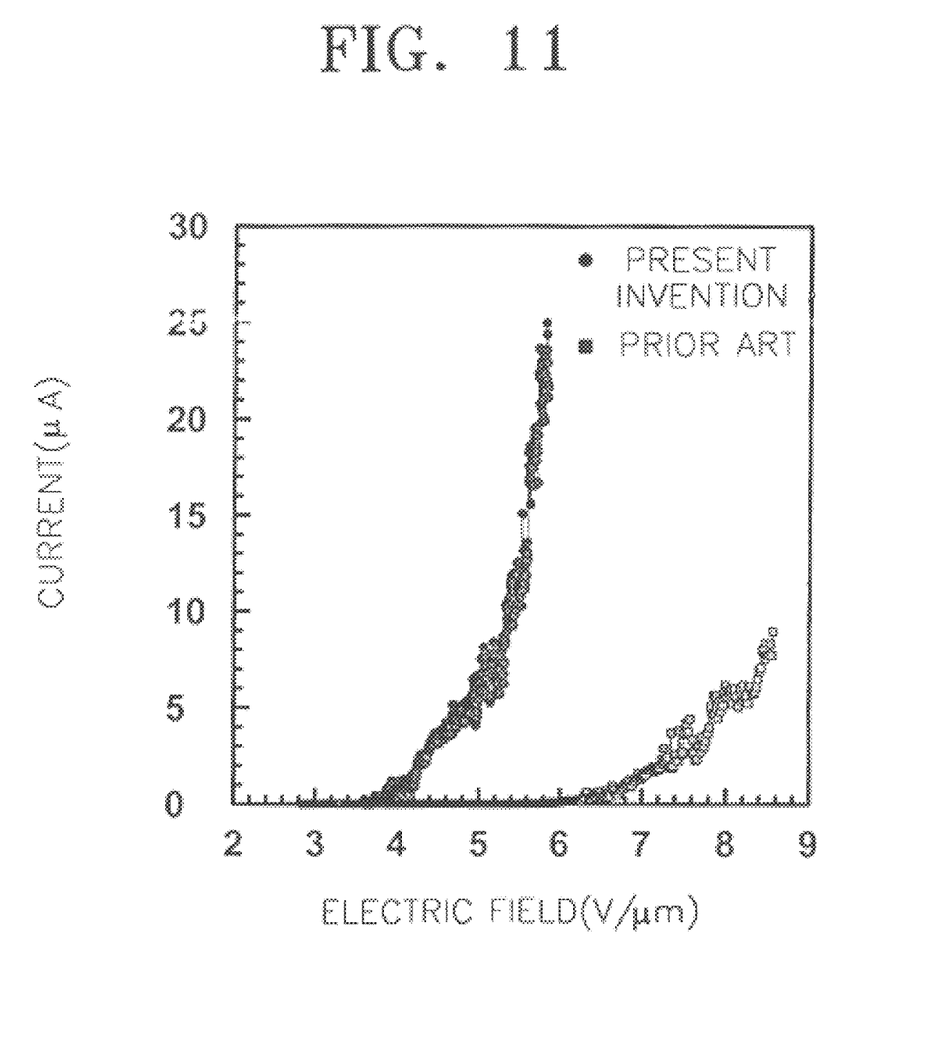
FIG. 11 is a graph comparatively showing field emission properties between carbon nanotubes formed in the preferred embodiment of the present invention and carbon nanotubes formed by a conventional method.

FIG. 11 is a graph comparatively showing field emission properties between the carbon nanotubes formed in the preferred embodiment of the present invention and the carbon nanotubes formed by a conventional method. The conventional method refers to a technique of continuously growing a carbon nanotube layer, without alternately applying the plasma deposition mode and the plasma etching mode, unlike the present invention. The field emission properties were measured for a field emission electrode having a unit area of 1 cm². It can be concluded from FIG. 11 that the purification of the carbon nanotubes by removing the graphitic phase or amorphous carbon particles from the tips or the sidewalls of the carbon nanotubes enables a high current emission at a low electric field.

The methods of forming carbon nanotubes according to the present invention can easily grow carbon nanotubes with a high density using, for example, a methane gas as a source gas under a high-density plasma condition. In addition, the graphitic phase or amorphous carbon particles, which are formed during the growth of the carbon nanotubes, can be removed easily by repeating the plasma deposition mode and the plasma etching mode, which results in carbon nanotubes having good field emission properties.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of forming carbon nanotube, in which a carbon nanotube layer is grown on a substrate using a plasma chemical vapor deposition method at a high plasma density of $10^{11}$ cm$^{-3}$ or more.

2. The method of claim 1, wherein the substrate is an amorphous silicon or polysilicon substrate on which a catalytic metal layer is formed.

3. The method of claim 1, wherein in the growth of the carbon nanotube layer, a hydrocarbon series gas is used as a plasma source gas, the temperature of the substrate is in the range of 600 to 900° C., and the pressure is in the range of 10 to 1000 mTorr.

4. A method of forming carbon nanotubes, comprising:

growing a carbon nanotube layer on a substrate to have a predetermined thickness by plasma deposition;

purifying the carbon nanotube layer by plasma etching; and repeating the growth and the purification of the carbon nanotube layer.

5. The method of claim 4, wherein growing the carbon nanotube layer is carried out by a plasma chemical vapor deposition method at a high plasma density of $10^{11}$ cm$^{-3}$ or more.

6. The method of claim 4, wherein the substrate is an amorphous silicon or polysilicon substrate on which a catalytic metal layer is formed.

7. The method of claim 4, wherein in the growth of the carbon nanotube layer, a hydrocarbon series gas is used as a plasma source gas, the temperature of the substrate is in the range of 600 to 900° C., and the pressure is in the range of 10 to 1000 mTorr.

8. The method of claim 4, wherein in purifying the carbon nanotube layer, a halogen-containing gas is used as a plasma source gas for etching.

9. The method of claim 8, wherein in purifying the carbon nanotube layer, a fluorine-containing gas is used as a plasma source gas for etching.

10. The method of claim 9, wherein in purifying the carbon nanotube layer, a carbon tetrafluoride (CF$_4$) gas is used as a plasma source gas for etching.

11. The method of claim 4, wherein in purifying the carbon nanotube layer, a oxygen-containing gas is used as a plasma source gas for etching.

12. The method of claim 4, wherein in growing the carbon nanotube layer, the carbon nanotube layer is grown to a thickness of 3 to 300 nm at a time.

13. The method of claim 6, wherein the carbon nanotube layer is grown on a metal-induction crystallized polysilicon layer changed from the amorphous silicon substrate by diffusion of a catalytic metal deposited on the amorphous silicon substrate.

* * * * *